United States Patent [19]

Rinaldi

[11] 4,146,829

[45] Mar. 27, 1979

[54] BATTERY DISSIPATION LIMITER CIRCUIT

[75] Inventor: Gerald M. Rinaldi, Mundelein, Ill.

[73] Assignee: GTE Automatic Electric Laboratories Incorporated, Northlake, Ill.

[21] Appl. No.: 853,610

[22] Filed: Nov. 21, 1977

[51] Int. Cl.² .................... H02H 7/18; H02H 7/20
[52] U.S. Cl. .................................. 320/13; 320/21; 323/15; 361/18; 361/71
[58] Field of Search .................. 323/15, 17; 320/13, 320/37, 38, 43, 21; 361/18, 89, 71

[56] References Cited

U.S. PATENT DOCUMENTS

| 3,376,478 | 4/1968 | Sheng et al. ............... 361/18 X |
| 3,621,276 | 11/1971 | Mitchell .................... 361/18 X |
| 3,974,403 | 8/1976 | Georgopoulos ............ 361/18 X |
| 4,013,925 | 3/1977 | Tice et al. .................... 361/18 |

Primary Examiner—Robert J. Hickey

[57] ABSTRACT

A circuit which protects a battery powered, pulse controlled, constant current power supply from excessive power dissipation. Voltage controllers disconnect the power supply from an associated battery, a predetermined time after current flows in the power supply, and reconnect the power supply to the battery a predetermined time after current ceases to flow in the power supply.

9 Claims, 2 Drawing Figures

BATTERY DISSIPATION LIMITER CIRCUIT

BACKGROUND OF THE INVENTION

(1) Field of the Invention

The present invention relates to electronic power supplies and more particularly to a circuit for protecting a battery powered, pulse controlled, constant current power supply from excessive power dissipation.

(2) Description of the Prior Art

Power supply protection devices are old and well known and are generally of the crowbar type. This type of circuit turns the power supply off when the amount of power being drawn exceeds a threshold level.

However, such crowbar protection circuits are incapable of protecting a power supply from failure due to an excessive duration of power dissipation as opposed to the amount of power dissipation. Duration of power dissipation problems are prevalent in pulse controlled power supplies. Such power supplies are generally designed to dissipate the power required for the duration of the control pulse, but if the control pulse should fail in the "power-on" mode, the continued full power dissipation will rapidly cause the power supply to fail. The usual solution to such duration of power dissipation problems is to design the power supply with expensive semi-conductor control devices and heat sinks so that the power supply can dissipate the power demanded without failure. But such a solution is expensive in terms of both components and space.

The Miller integrator, as described in Strauss, *Wave Generations and Shaping,* McGraw Hill, 1960, is similar to the Applicant's invention. However, the Miller integrator is a 3 terminal device and its output is the time integral of its input scaled by the circuit parameters. The Applicant's invention, in the first preferred embodiment, is a two terminal device whose output is not a function of its input and is determined solely by the circuit parameters. A second preferred embodiment was designed to depend on the input current yet still retain the two terminal structure.

Accordingly, it is the object of this invention to provide a new protection circuit for a battery powered, pulse controlled, constant current power supply that will turn the power supply off after a fixed period of time, requiring a minimum number of components and can be implemented as a two terminal device.

SUMMARY OF THE INVENTION

The present invention is a circuit which protects a battery powered, pulse controlled, constant current power supply from excessive power dissipation. This circuit is connected between the power supply and the associated battery and limits the power dissipation in the power supply by varying the voltage between the power supply and the battery. This circuit consists of a transistor for voltage control, with a capacitor for voltage storage, connected across the collector and base of the transistor. A resistor is connected across the base and emitter leads of the transistor to provide constant current through the capacitor. A diode is also connected across the base and emitter leads of the transistor to provide a shunt path for the capacitor when it discharges, and to protect the base-emitter junction of the transistor from excessive reverse voltage. A second resistor is connected across the emitter and collector leads of the transistor to control the rate of discharge of the capacitor.

When a pulse is applied to the control lead of the power supply, current flows from the battery through the power supply, through the protection circuit and back to the battery. When current initially flows, the voltage across the protection circuit is close to ground potential and the power supply delivers full power to its load. However, as current continues to flow through the protection circuit, the voltage across its terminals varies linearly with time at a preset rate (approximately 20 volts/millisecond). After a time, the power supply can no longer compensate by reducing its voltage and the power supply current output begins to drop. When current ceases to flow from the power supply through the protection circuit the output voltage of said protection circuit recovers to its original ground potential at a preset rate, independent of the rate at which the voltage rises.

The protection circuit parameters are chosen such that the power supply can provide full power to its load for the duration of a normal control pulse but limits the power dissipation if the control pulse becomes inadvertently extended. Therefore, this protection circuit has no effect on normal power supply operation but protects it from excessive power dissipation if there is a control pulse fault.

DESCRIPTION OF THE PREFERRED EMBODIMENTS

Figure 1:
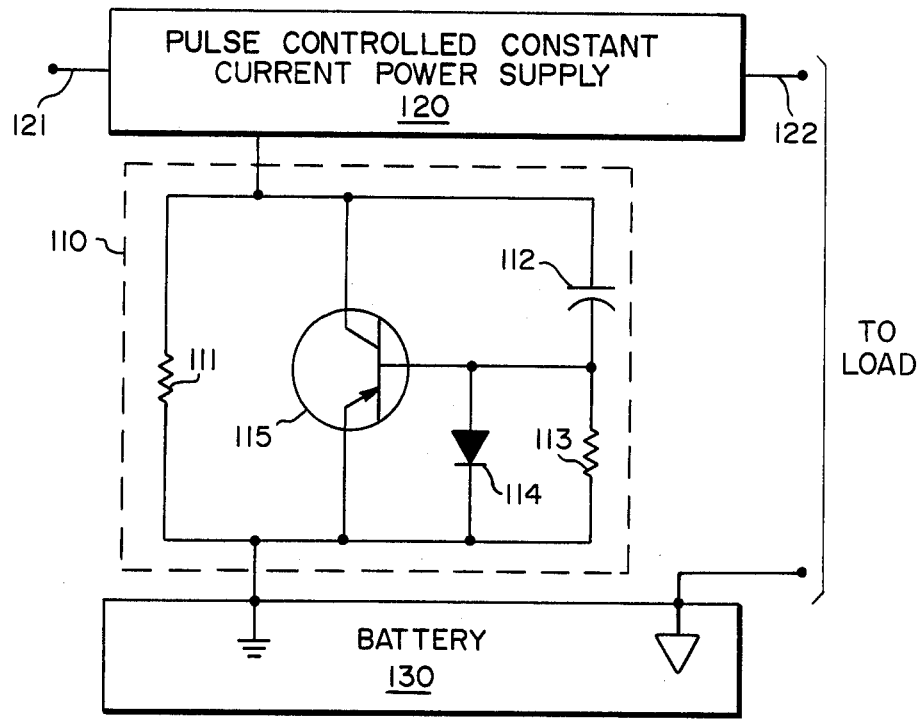
FIG. 1 is a schematic circuit diagram of a power dissipation limiter circuit in accordance with the present invention.

Referring now to FIG. 1, the dissipation limiter circuit 110 of the present invention is shown connected between the pulse controlled, constant current power supply 120, which has input control lead 121 and power output lead 122, and associated battery 130. This dissipation limiter circuit 110 includes voltage control transistor 115 connected between the pulse controlled, constant current power supply 120 and its associated battery 130, voltage storage capacitor 112 connected across the base and collector of said transistor, and charging current control resistor 113 connected across the base and emitter of said transistor. A shunt diode 114 is also connected across the base and emitter of transistor 115 and a discharge current control resistor 111 is connected across the collector and emitter of said transistor.

During normal operation of the power supply 120, the presence of the power dissipation limiter circuit 110 has no effect on said power supply, which provides current to its load on power output lead 122 for the duration of each input control pulse at lead 121. Protection only takes place when the power supply input control lead 121 fails in such a manner as to cause said power supply to dissipate power for a longer duration than the tolerance allowed for a valid control pulse.

In operation, the voltage at the collector of transistor 115 will start out close to ground if power supply input 121 is not being driven. When current starts to flow in the protection circuit, the collector voltage of transistor 115 begins to go negative linearly with time at a preset rate, (approximately 20 volts/millisecond). The power supply 120 will compensate for this voltage loss by reducing its output voltage at power output lead 122 thus keeping the output current constant. This will be true for the duration of the normal pulse operation, which in one application was 320 microseconds. After a time, the current source can no longer compensate by reducing its output voltage and the current begins to drop. By the time a steady state condition is reached, the dissipation of the power supply has been reduced to a safe value and transistor 115 is turned off.

This power dissipation limiter circuit has been designed such that the voltage rise across the circuit, V110, is not a function of the current passing through it, I110, but is only a function of the selectable circuit parameters for resistor 113 and capacitor 112. When the current ceases to flow through this circuit, capacitor 112 discharges through resistor 111 and diode 114. Since the voltage rise of the circuit is not dependent on resistor 111 the rundown and recovery times of V110 are independently selectable.

Detailed analysis of FIG. 1 shows that the voltage drop across the circuit (V110) = the voltage across capacitor 112 (V112) plus the voltage across resistor 113 (V113) and is essentially equal to the voltage drop across capacitor 112 since V110 = V112 + V113 and V110 = V112 because V113, is small since it equals the base emitter voltage VBE, of transistor 115. This relationship is described by the following equation, in which I112 is the current through capacitor 112.

$$V110 = V112 = \frac{1}{C} \int_O^T I112 \, dt = \frac{I112T}{C(112)} =$$

$$\frac{V113 \times T}{R(113) \times C(112)} = \frac{VBE \times T}{R(113) \times C(112)}$$

This equation shows that V110 rises linearly as a function of time and independent of the external current through the protection circuit, I110.

When the external circuit is opened, I110 = 0, transistor 115 turns off and capacitor 112 discharges through diode 114 and resistor 111 with a time constant $T_D = R(111) \times C(112)$, which is selectable, independent of the linear voltage rise rate which depends on the parameters chosen for R(113) and C(112).

Figure 2:
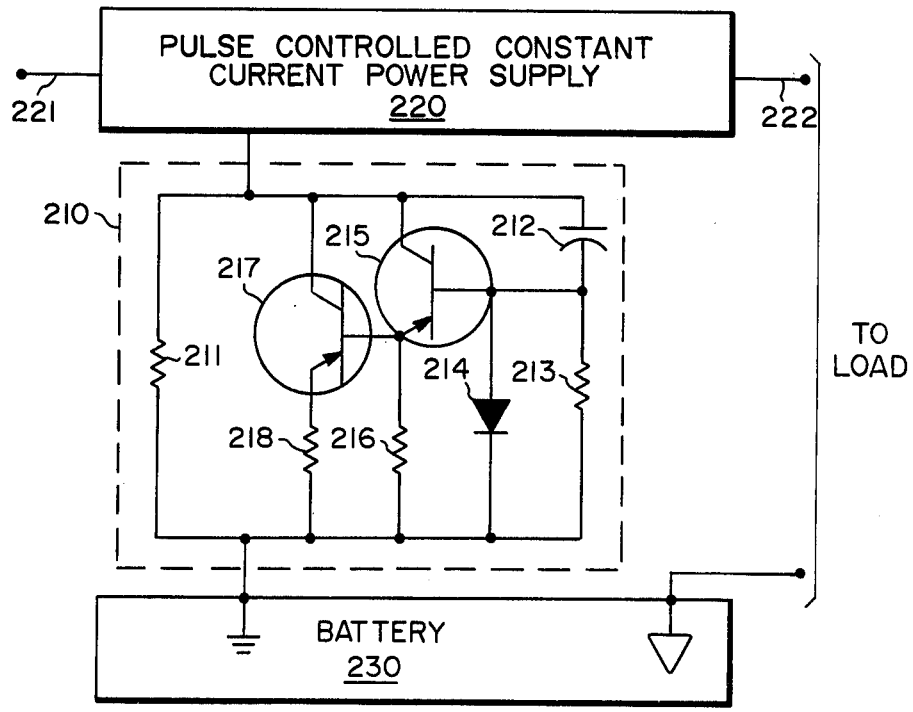
FIG. 2 is a modification of the circuit of FIG. 1 which provides protection for high power, constant current power supplies.

Referring now to FIG. 2, the circuit shown is a modification of the circuit in FIG. 1 and was designed to protect high power, constant current power supplies by providing a quicker rate of voltage change. This was achieved by making the voltage across the protection circuit depend on the external current flowing through the protection circuit.

In the circuit of FIG. 2, transistor 115 has been replaced by a Darlington pair of transistors 215 and 217, and their emitter resistors 216 and 218 respectively. Therefore, in FIG. 2, the collector of transistors 215 and 217 are connected to each other and resistors 216 and 218 are connected to each other and to the emitter of transistor 215 and 217 respectively. The common collector point is then connected to pulse controlled, constant current power supply 220 and the common resistor point is connected to battery 230. To complete the Darlington configuration, the base of transistor 217 is connected to the emitter of transistor 215.

The remaining circuit devices of FIG. 2 are connected across transistor 215 in the same way as they were used in FIG. 1. Capacitor 212 is connected to the base and collector of transistor 215 and resistor 213 and diode 214 are connected in parallel, and across the base of transistor 215 and the common point for resistors 216 and 218. Resistor 211 is then connected across the common collector point of transistor 215 and 217 and the common point for resistors 216 and 218.

In order to protect a high power, constant current, pulse controlled power supply it has to be turned off quicker than the capabilities of the circuit of FIG. 1 provide. This more rapid response to current flow is achieved by using an emitter resistor with the voltage control transistor. Also, in order to assure that the current through capacitor C212 remains constant, a Darlington pair of transistors is used to satisfy the requirement that the base current of transistor 215 be much smaller than the current through R213.

The dependence of the linear voltage rise rate of this circuit on the external current through the protection circuit (I210) can be seen from the following equation, in which 2VBE is the base emitter voltage of transistors 215 and 217, I212 is the current through capacitor 212 and I218 is the current through resistor 218.

$$V210 = \frac{1}{C} \int_O^T I212 \, dt = \frac{I212 \times T}{C212} =$$

$$\frac{(I218 \times R(218) + 2VBE) \times T}{R(213) \times C(212)}$$

This expression shows the dependence of I212 on the external circuit current due to the use of R(218) whose voltage also appears across R(213).

The power dissipation limiter circuits of the present invention, FIG. 1 and FIG. 2, protect pulse controlled, constant current power supplies from excessive power dissipation by rendering them essentially inoperative a predetermined time after the duration of a normal control pulse. During normal operation, the presence of these circuits would have no effect since the power supply will cease delivering power when each control pulse terminates.

It will be obvious to those skilled in the art that numerous modifications of the present invention can be made without departing from the spirit of the invention which shall be limited only by the scope of the claims appended hereto.

What is claimed is:

1. A protection circuit for a battery powered, pulse controlled, constant current power supply, comprising:
   first voltage control means including amplifying means with a control lead, an input lead connected to said battery, and an output lead connected to said power supply;
   voltage storage means connected to said power supply and to said amplifying means control lead;
   first current control means connected to said amplifying means control lead and to said battery;
   whereby in response to a flow of current from said battery to said power supply, through said first voltage control means, said first voltage control means is operated after a predetermined period of time to essentially disconnect said battery from said power supply.

2. A protection circuit as claimed in claim 1, wherein there is further included: second voltage control means connected between said power supply and said battery, and in parallel with said first voltage control means;
   said second voltage control means comprising a second current control means connected between said power supply and said battery;

unidirectional current shunt means connected between said voltage storage means and said battery; and said voltage storage means;

whereby in response to absence of a flow of current from said battery to said power supply through said first voltage control means, said power supply is reconnected to said battery after a second predetermined period of time, independent of said first predetermined period of time, and said power supply is conditioned for reoperation.

3. A protection circuit as claimed in claim 1, wherein: the operation of said first voltage control means is a function of both the amount of current flowing through said first voltage control means and said first predetermined period of time.

4. A protection circuit as claimed in claim 1, wherein: said first voltage control means comprise a capacitor.

5. A protection circuit as claimed in claim 2, wherein: said unidirectional current shunt means comprise a diode.

6. A protection circuit as claimed in claim 1, wherein: said first current control means comprise a resistor.

7. A protection circuit as claimed in claim 2, wherein: said second current control means comprise a resistor.

8. A protection circuit as claimed in claim 1, wherein: said amplifying means, including control, input and output leads, comprise a transistor, including base, emitter and collector leads, respectively.

9. A protection circuit as claimed in claim 8, wherein: said amplifying means comprise first and second transistors, each including base, emitter and collector leads, the collector lead of said first transistor connected to the collector lead of said second transistor and to said power supply, the emitter lead of said first transistor connected to the base lead of said second transistor and a third resistor, the emitter lead of said second transistor connected to a fourth resistor and said third and fourth resistors are connected to each other, and to said battery, and the base lead of said first transistor is connected between said voltage storage means and said first resistor.

* * * * *